(12) United States Patent
Masuda et al.

(10) Patent No.: US 9,211,828 B2
(45) Date of Patent: Dec. 15, 2015

(54) CUP HOLDER

(71) Applicant: NIHON PLAST CO., LTD., Shizuoka (JP)

(72) Inventors: Yasuhisa Masuda, Shizuoka (JP); Kazuhisa Yamamoto, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 0 days.

(21) Appl. No.: 14/280,427

(22) Filed: May 16, 2014

(65) Prior Publication Data

US 2014/0339846 A1    Nov. 20, 2014

(30) Foreign Application Priority Data

May 20, 2013    (JP) ................................. 2013-106294

(51) Int. Cl.
*B60N 3/10*    (2006.01)

(52) U.S. Cl.
CPC ................ *B60N 3/102* (2013.01); *B60N 3/106* (2013.01); *Y10S 224/926* (2013.01)

(58) Field of Classification Search
CPC .......... B60N 3/10; B60N 3/102; B60N 3/106; Y10S 224/926
USPC ......... 248/311.2, 230.1, 309.1; 224/281, 282, 224/483, 926; 296/37.12, 37.1, 37.8; 297/188.1, 188.17

See application file for complete search history.

(56) References Cited

U.S. PATENT DOCUMENTS

| | | | | |
|---|---|---|---|---|
| 4,981,277 A | * | 1/1991 | Elwell | 248/311.2 |
| 5,820,094 A | * | 10/1998 | Tanaka | 248/311.2 |
| 5,876,007 A | * | 3/1999 | Lancaster et al. | 248/311.2 |
| 5,897,089 A | * | 4/1999 | Lancaster et al. | 248/311.2 |
| 5,944,240 A | * | 8/1999 | Honma | 224/281 |
| 6,076,793 A | | 6/2000 | Yamamoto | |
| 2013/0008932 A1 | | 1/2013 | Shindo | |

FOREIGN PATENT DOCUMENTS

| | | |
|---|---|---|
| FR | 2758777 A1 | 7/1998 |
| JP | 10095263 A | 4/1998 |
| JP | 2004161124 A | 6/2004 |

OTHER PUBLICATIONS

Great Britain Search Report issued Nov. 1, 2014; GB Application No. 1408914.8.

* cited by examiner

*Primary Examiner* — Tan Le
(74) *Attorney, Agent, or Firm* — Arent Fox LLP

(57) ABSTRACT

The present invention provides a cup holder that is capable of preventing a drawing portion from being pushed and retracted while maintaining a state in which a cup is held. A retraction preventing portion is formed on an interior face of a bottom face of the holder case, and a protrusion is formed so as to be oriented to the bottom face's side of the holder case at a rear end part of a turnable holding arm portion that is provided at a drawing portion. In the case where an attempt is made to retract the drawing portion while maintaining the state in which the cup is held, the protrusion abuts against the retraction preventing portion, and retraction of the drawing portion can be prevented.

5 Claims, 12 Drawing Sheets (a)

(b)

CUP HOLDER

CROSS REFERENCE TO RELATED APPLICATIONS

This application claims priority of Japanese Patent Application No. 2013-106294 filed on May 20, 2013. The contents of this application are incorporated herein by reference in their entirety.

BACKGROUND OF THE INVENTION

1. Field of the Invention

The present invention relates to a drawer-formed cup holder that is mounted to a vehicle, and that is used to place a cup, a can, a polyethylene terephthalate (PET) bottle for ingredients or the like.

It is to be noted that a cup in the present invention is used as a generic term of the above mentioned cup or glass, can, polyethylene terephthalate (PET) bottle or the like, that can be held by a cup holder.

2. Description of the Related Art

In general, a drawer-formed cup holder is provided with a drawing portion that is capable of drawing into a holder case through an opening that is formed in the holder case, and at a front end side of the drawing portion, a side face support portion adapted to a hold a side face of a cap is constructed. As a cup holder provided with such constituent elements, there has been proposed a cup holder for vehicle described in Japanese Unexamined Patent Application Publication No. 2004-161124.

In the cup holder for vehicle described in Japanese Unexamined Patent Application Publication No. 2004-161124, a side face support portion of a cup is provided on a site of each of the left and right in a front end part of a holder main body (which is equivalent to the drawing portion mentioned above), and there are also provided: a holding recessed portion in which a lateral side is opened; and a holding arm portion that is pivoted on the drawing portion and that turns so as to come close to, or alternatively, to be spaced from, the holding recessed portion. The holding arm portion is biased by a spring so as to turn toward the holding recessed portion's side.

In so far as an gap between tip end parts of one pair of holding arm portions is concerned, when the holder main body is pressed and slid against a storage position, the tip end part' side of the holding arm portion is turned to the holding recessed portion's side, and a widthwise dimension at the tip end part of the holding arm portion while in storage can be reduced. Also, when the holder main body is drawn at a drawing position, the tip end part's side of the holding arm portion is turned in such a direction as to be spaced from the holding recessed portion, and the widthwise dimension at the tip end part of the holding arm portion can be increased more significantly than a width of a holder case. In addition, at the drawing position of the holder main body, a cup can be held, between the holding recessed portion and the holding arm portion that has been biased by a spring.

Conventionally and up to now, as a cup holder provided with general constituent elements, there has been proposed an invention described in Japanese Unexamined Patent Application Publication No. 2004-161124 or the like in which, for example, in a state in which a paper cup or a polyethylene terephthalate (PET) bottle or the like is held by the side face support portion, if the holder main body is forcibly moved from the drawing position to the storage position, the paper cup or the polyethylene terephthalate (PET) bottle hits the holder case and then collapses, and the drink contained therein overflows. As a result, the periphery of the cup holder is then polluted by the contained drink having overflowed.

In addition, in a state in which the paper cup or the polyethylene terephthalate (PET) bottle or the like is kept to be held, in the case where the holder main body is forcibly pushed into the storage position's side, the paper cup or the polyethylene terephthalate (PET) bottle or the like contained in the holder case hinders an action of drawing of the holder main body, thus making it difficult to draw the holder main body up to the drawing position again.

SUMMARY OF THE INVENTION

As described above, in the conventional cup holders, there is no restriction on forcibly pushing the drawing portion to the storage position's side while maintaining a state in which a cut is held, and thus, a variety of problems have occurred. It is an object of the present invention to provide a cup holder that is capable of solving such problems that still remain unsolved in the conventional cup holders.

The above mentioned object of the present invention can be achieved according to first to fifth aspects of the present invention as follows.

That is, a cup holder according to the first aspect of the present invention is most primarily provided, and includes: a holder case of which a front face opens; and a drawing portion that is assembled in the holder case, and that is capable of retractably sliding into the holder case though an opening of the holder case, wherein the drawing portion has a support portion adapted to a cup, the support portion includes a holding arm that is pivoted on the drawing portion via a turning shaft, and that turns in a direction crossing a drawing direction of the drawing portion, the holding arm portion has a tip end part adapt to abut against and hold a cup and a rear end part that is arranged on an opposite side to the tip end part in a state in which the turning shaft is sandwiched therebetween, and a retraction preventing portion adapted to prevent retraction of the drawing portion in a state in which the cup is held by the support portion by way of abutment against a rear end part's side of the holding arm portion is formed in the holder case.

In addition, the cup holder according to the second aspect of the present invention is primarily provided in such a manner that a protrusion is formed at a rear end part of the holding arm portion, and when the drawing portion is retracted in a state in which a cup is held by the support portion, the protrusion abuts against the retraction preventing portion.

Further, the cup holder according to the third aspect of the present invention is primarily provided in such a manner that when the protrusion breaks, a rear end part's side of the holding arm portion and the retraction preventing portion are arranged in such a state as to be free of abutment against each other.

Furthermore, the cup holder according to the fourth aspect of the present invention is primarily provided in such a manner that on the holding arm portion, a spring adapted to turn and bias one end side of the holding arm portion toward a cup holding direction is provided, in the holder case, a guide portion adapted to guide a rear end part of the holding arm portion is formed, the guide portion restrains a tip end part's side of the holding arm at a position which is storable in the holder case storable, and when the drawing portion is drawn and a state in which the cup can be held by the support portion is established, the guide portion is formed in a shape that allows a tip end part's side of the holding arm to turn in a further widening direction from a holding position side of the cup against a spring force of the spring, and the retraction preventing portion is constructed as a part of the guide portion.

Still furthermore, the cup holder according to the fifth aspect of the present invention is primarily provided in such a manner that the support portion has a holding recessed portion that is formed in the retracting portion and the holding arm portion that turns in a horizontal direction, and a side face of the cup is held between the tip end part's side of the holding arm portion that turns in the horizontal direction and the holding recessed portion.

In the cup holder according to any one of the first to fourth aspects of the present invention, in order to prevent retraction of a drawing portion while maintaining a state in which a cup is held, a retraction preventing portion against which a rear end part's side of a holding arm portion abuts to prevent retraction of the holding arm portion is formed in a holder case.

In the cup holder according to any one of the first to fourth aspects of the present invention, in a state in which no cup is held at a support portion, abutment of a rear end part of a holding arm portion against the holding arm portion does not take place. As a result, the holding arm portion can arbitrarily turn. In addition, a drawing portion can be pushed up to a storage position without the retraction of the drawing portion being hindered by the retraction preventing portion.

In so far as a construction of the support portion is concerned, the support portion can be constructed as a holding arm portion for side face holding, the arm portion turning in a horizontal direction in which a side face of a cup is held, or alternatively, can be constructed as a holding arm portion for bottom receiving, the arm portion turning in a vertical direction while receiving a bottom face of a cup. Alternatively, in so far as a construction of the support portion is concerned, the support portion can also be constructed with both of the holding arm portion for side face holding and the holding arm for bottom receiving.

In a state in which the cup is held at the support portion, the rear end part's side of the holding arm portion turns at such as position as to abut against the retraction preventing portion. With such a construction, even if an attempt is made to push the drawing portion up to the storage position, the rear end part's side of the holding arm portion abuts against the retraction preventing portion, and the retraction of the drawing portion is prevented.

Thus, according to any one of the first to fourth aspects of the present invention, in the case where the drawing portion is forcibly pushed in a state in which the cut is held, for example, it is possible to prevent collapsing of the paper cup or the polyethylene terephthalate (PET) bottle that has been held by the holding arm portion for side face holding. In addition, it is possible to prevent an occurrence of a circumstance in which it becomes difficult to draw out the drawing portion from the holder case again.

In addition, in the case where the bottom of the cup is supported by the holding arm portion receiving a bottom, when the drawing portion is stored, if the holding arm portion for bottom receiving jumps, the cup is pushed up by the holding arm portion for bottom receiving and then the cup jumps in an upward direction. As a result, a floor is miserably polluted by the drink contained in the cup.

According to any one of the first to fourth aspects of the present invention, when the drawing portion is stored, when the bottom of the cup is supported by the holding arm portion for bottom receiving, the rear end part of the holding arm portion for bottom receiving abuts against the retraction preventing portion, thus making it possible to prevent jumping of the holding arm portion for bottom receiving.

Thus, according to any one of the first to fourth aspects of the present invention, it is possible to reliably prevent the drawing portion from being retracted to the storage position while maintaining the state in which the cup is held by the support portion.

According to any one of the first to fourth aspects of the present invention, in so far as a construction adapted to abut the rear end side of the holding arm portion and the retraction preventing portion against each other is concerned, the protrusion is formed at the rear end part of the holding arm portion, and when the drawing portion is retracted the state in which the cup is retained is maintained, the protrusion that is formed at the rear end part can be constructed so as to be abut against the retraction preventing portion. In addition, in the case where the protrusion breaks, the rear end part's side of the holding arm portion and the retraction preventing portion can be constructed so as to be free of abutment against with each other.

By employing such a construction, the retraction of the drawing portion while maintaining the state in which the cup is held can be prevented by the protrusion abutting against the retraction preventing portion. In addition, in the case where an excessive pushing force acts on the drawing portion, for example, the protrusion breaks, thereby making it possible to prevent the cup holder itself from being damaged due to the breakage of the protrusion.

According to any one of the first to fourth aspects of the present invention, the guide portion adapted to guide the rear end part of the holding arm portion can be formed in the holder case, and the retraction preventing portion can be constructed as a part of the guide portion. Thus, the retraction preventing portion is constructed as a part of the guide portion, whereby a rigidity of the retraction preventing portion can be enhanced. In addition, in the case where the protrusion is formed at the rear end part of the holding arm portion, even if the excessive pushing force acts on the drawing portion, it is possible to prevent the retraction preventing portion from being damaged due to the breakage of the protrusion.

According to any one of the first to fourth aspects of the present invention, in so far as a construction adapted to hold the side face of the cup at the support portion is concerned, such a construction can be made of a group of the holding recessed portion that is formed in the drawing portion and the holding arm portion. In addition, in so far as a construction adapted to hold the side face of the cup is concerned, such a construction can be made to pinch the cup from both lateral face sides with the use of one pair of the holding arm portions. Further, there can be employed a construction adapted to receive the bottom of the cup with the use of a bottom plate that is integrally formed with the drawing portion without a need to provide the holding arm portion for bottom receiving.

A construction of providing the holding arm portion for bottom receiving is employed, whereby at the time of storage of the drawing portion, the holding arm portion for bottom receiving can be held in a substantially horizontal state and thus a dimension of a vertical direction of the cup holder can be constructed so as to be short in length, and the cup holder can be compactly constructed.

DESCRIPTION OF THE PREFERRED EMBODIMENTS

Figure 1:
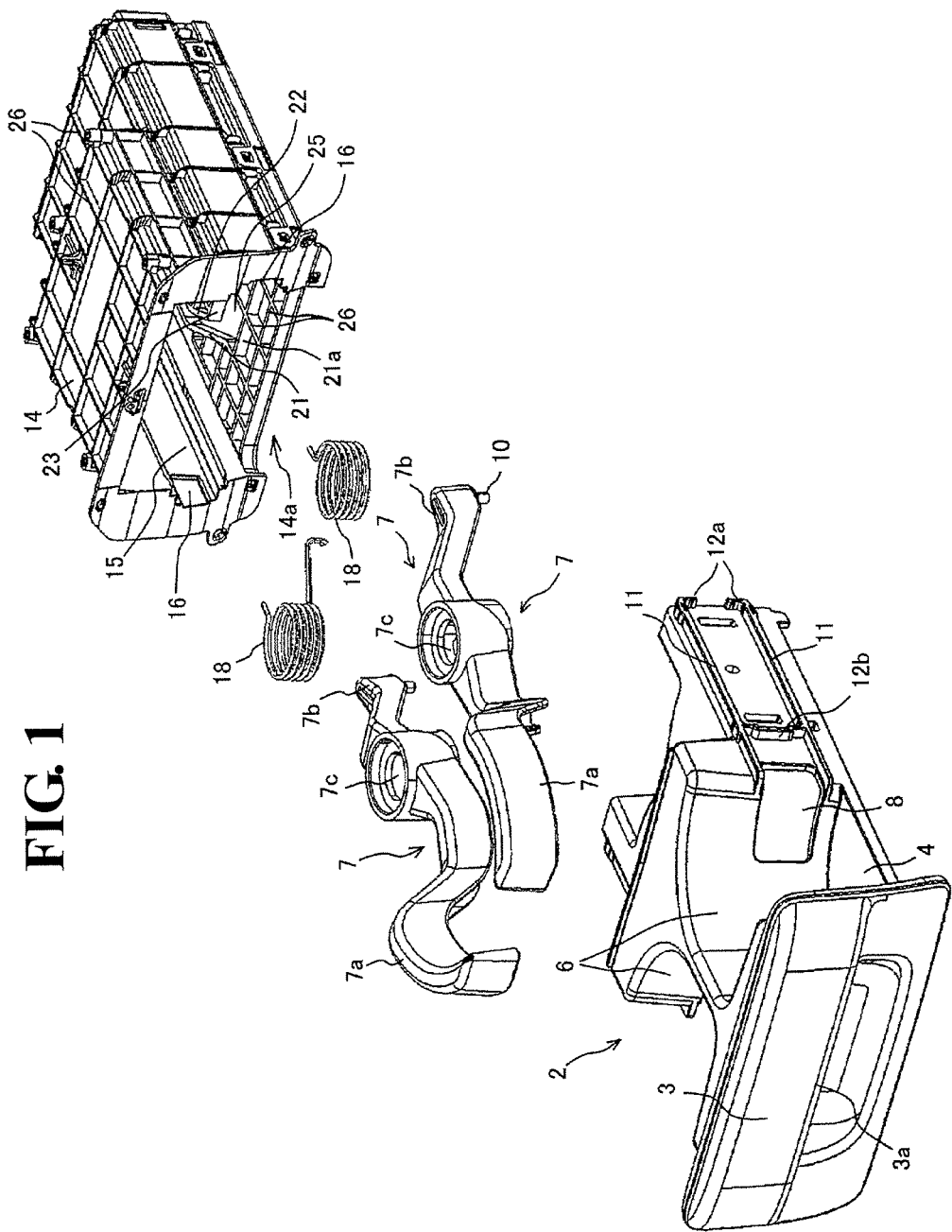
FIG. 1 is an exploded perspective view before assembling a cup holder (according to an embodiment)

Hereinafter, embodiments of the present invention will be specifically described with reference to the accompanying drawings. A cup holder according to the present invention can be attached on an instrument panel, a console box, or a seat or the like. In addition, with respect to the cup holder which will be described hereinafter, a more detailed description will be given by way of an example of a construction in which a holding recessed portion is arranged inside of a drawing portion and a holding arm portion that turns so as to come close to, or alternatively, to be spaced from, the holding recessed portion is arranged a lateral side of the drawing portion.

However, the cup holder according to the present invention is not limited to such a construction. For example, even if there would be a construction in which a holding recessed portion is arranged on a lateral side of a drawing portion, and a holding arm portion that turns so as to come close to, or alternatively, to be spaced from, a holding recessed portion is arranged inside of the drawing portion, the present invention can be preferably applied. In addition, a side face support portion made of a holding recessed portion and a holding arm portion is constructed at each side part in a front side of the drawing portion, or alternatively, can be constructed at one side part.

Therefore, it would be obvious to one skilled in the art that the present invention is not limited to embodiments which will be described hereinafter, and a variety of modifications to the described embodiments can occur without deviating from the scope and/or spirit of the invention.

EMBODIMENTS

A construction of a cup holder 1 according to the present invention will be described with reference to FIG. 1 to FIG. 9.

Figure 11:
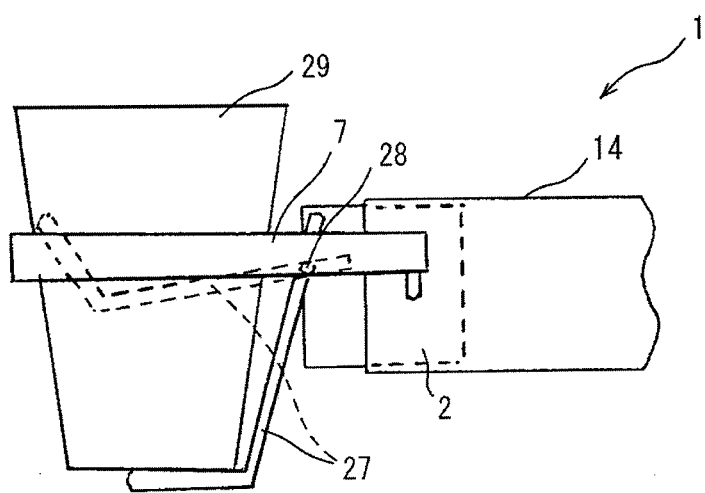
FIG. 11 is a side view of essential portions showing a construction of a holding arm portion for bottom receiving (according to an embodiment)
Figure 12:
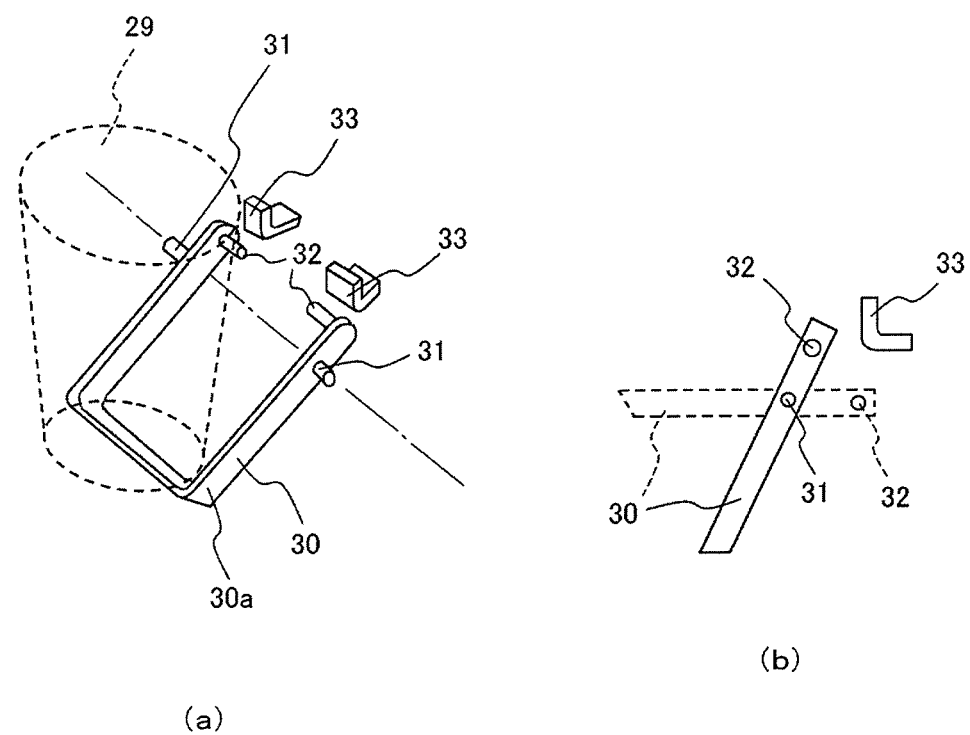
FIG. 12 (*a*) and FIG. 12 (*b*) are a perspective view and a sectional view of essential portions showing a construction of another holding arm portion for bottom receiving (according to an embodiment).

As shown in FIG. 1, the cup holder 1 is constructed with a holder case 14, a drawing portion 2, one pair of holding arm portions 7 for side face holding, and one pair of coil springs 18 adapted to turn and bias each of the holding arm portions 7 for side face holding. In addition, as shown in FIG. 11 and FIG. 12, this cup holder can be constructed with retaining arm portions 27, 30 for bottom receiving of a cup 29 as well.

A holding portion in the present invention is constructed so as to be appropriately combining the holding arm portions 7 for side face holding, a holding recessed portion 6, and the holding arm portions 27, 30 for bottom receiving with each other. Hereinafter, a construction provided with the holding arm portions 7 for side face holding will be first described, and thereafter, a construction of the holding arm portions 27, 30 for bottom receiving will be described.

Figure 2:
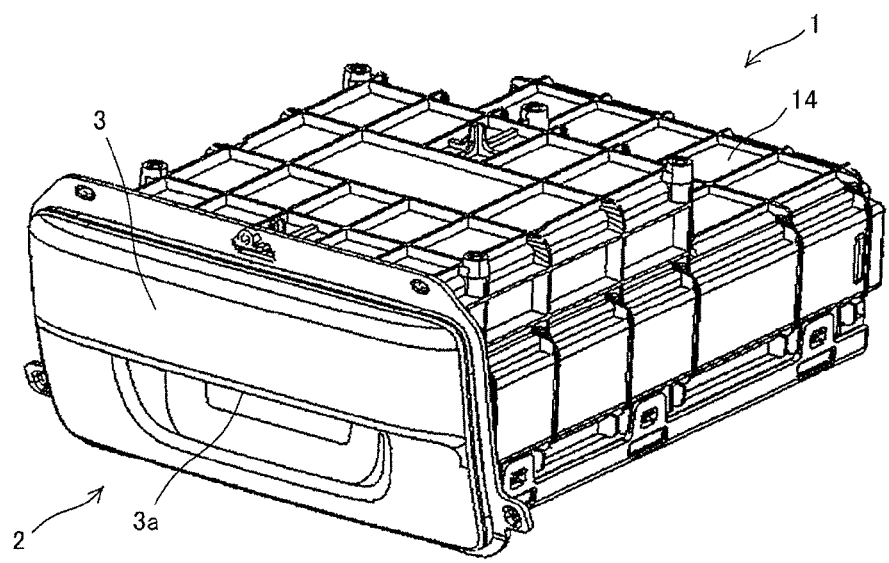
FIG. 2 is a perspective view showing a storage state of a drawing portion (according to an embodiment)
Figure 3:
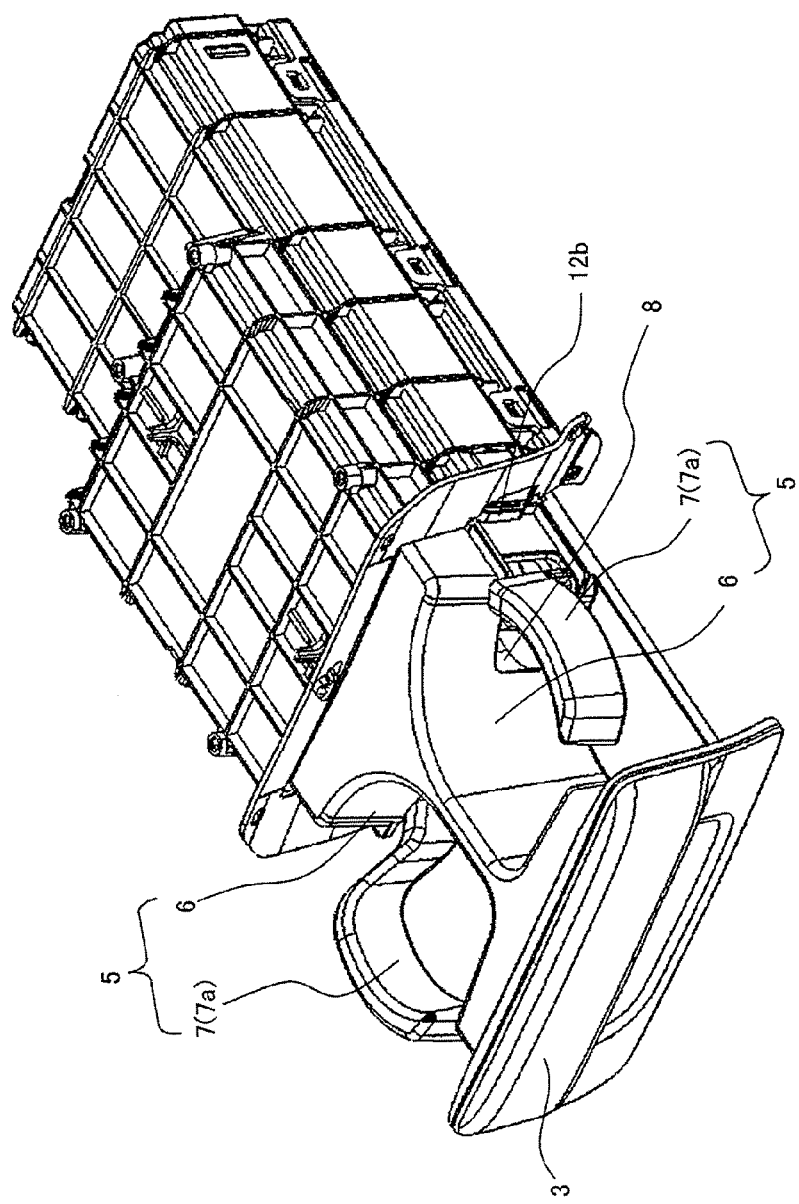
FIG. 3 is a perspective view showing a drawing state of a drawing portion (according to an embodiment)

On a front face of the drawing portion 2, a capping body 3 is provided, and by manipulating a grip 3*a* that is formed at the capping body 3, the drawing portion 2 that is established in a storage state shown in FIG. 2 can be drawn in an outward direction from an opening 14*a* of a holder case 14. A state in which the drawing portion 2 has been drawn from the holder case 14 is shown in FIG. 3. In addition, by pressing the capping body 3 from this state, the drawing portion 2 can be stored in the holder case 14 as well.

Further, as shown in FIG. 1, the cup holder 1 is constructed as one unit, and can be attached to a required setup location. Furthermore, on an outer surface of the holder case 14 and on a bottom face of the holder case 14, reinforce ribs 26 are formed in a lattice shape, and a rigidity of the holder case 14 is enhanced.

As shown in FIG. 1, on a front side of the drawing portion 2, one pair of left and right side face support portions 5 are constructed. Each of the side face support portions 5 is made of: a holding recessed portion 6 that is formed on a main body side of the drawing portion 2; and holding arm portions 7 for side face holding, each of which turns so as to come close to, or alternatively, to be spaced from, the holding recessed portion 6. In so far as the shape on the side of a tip end part 7*a* of each of the holding arm portions 7 is concerned, a curved face that is curved to the inside is formed. A side face of a cup can be held between the curved face that is formed at each of the holding arm portions 7 and the holding recessed portion 6. In addition, on a bottom face side of each of the side face support portions 5, a bottom face support portion 4 is formed as well.

On the side of a rear end part 7*b* of each of the holding arm portions 7, a protrusion 10 to be described later is formed toward a lower side. The protrusion 10 can be integrally molded at the time of molding of a holding arm portion 7. In order to turn the holding arm portion 7 in a horizontal direction, a shaft hole 7*c* to be pivoted in a turning shaft 17 (reference should be made to FIG. 6 and FIG. 7) is formed on a site that is proximal to the rear end part 7*b*. That is, the rear end part 7*b* and the tip end part 7*a* that is opposite thereto are provided in s state in which the turning shaft 17 is sandwiched between these end parts.

Moreover, at the time of assembling, the tip end part 7*a* of the holding arm portion 7 can be protruded to the side of the side face support portion 5 from an arm mounting hole 8 that is formed in the holding recessed portion 6. In addition, the shaft hole 7*c* of the holding arm portion 7 can be arranged on a back face side of the arm mounting hole 8, and a turning quantity of the tip end part 7*a* of the holding arm portion 7 can be constructed so as to be large as well.

Figure 6:
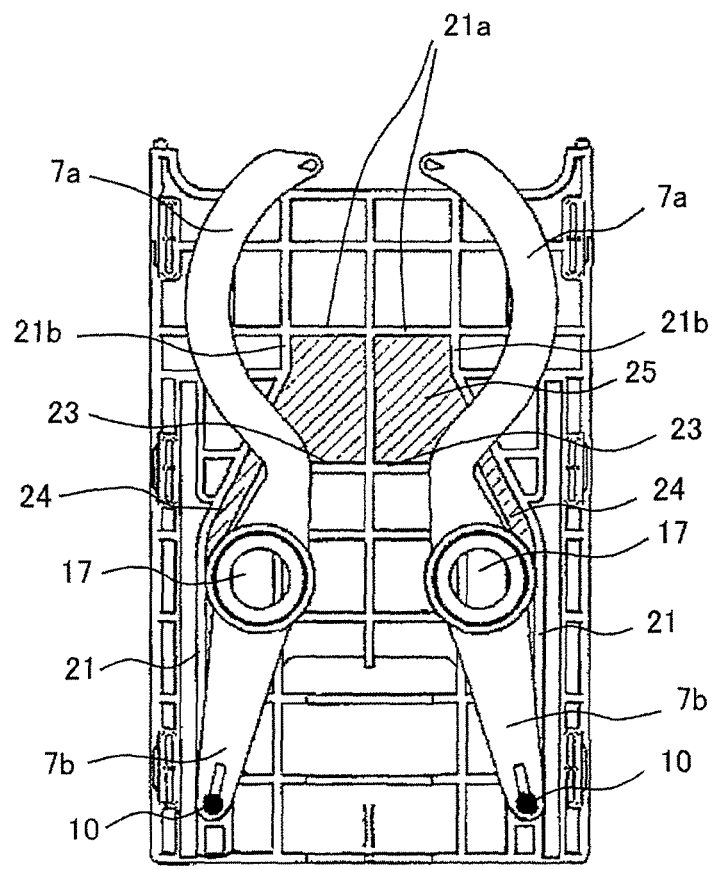
FIG. 6 is a plan view of essential portions showing a state of a holding arm portion for side face holding at a storage position (according to an embodiment)
Figure 7:
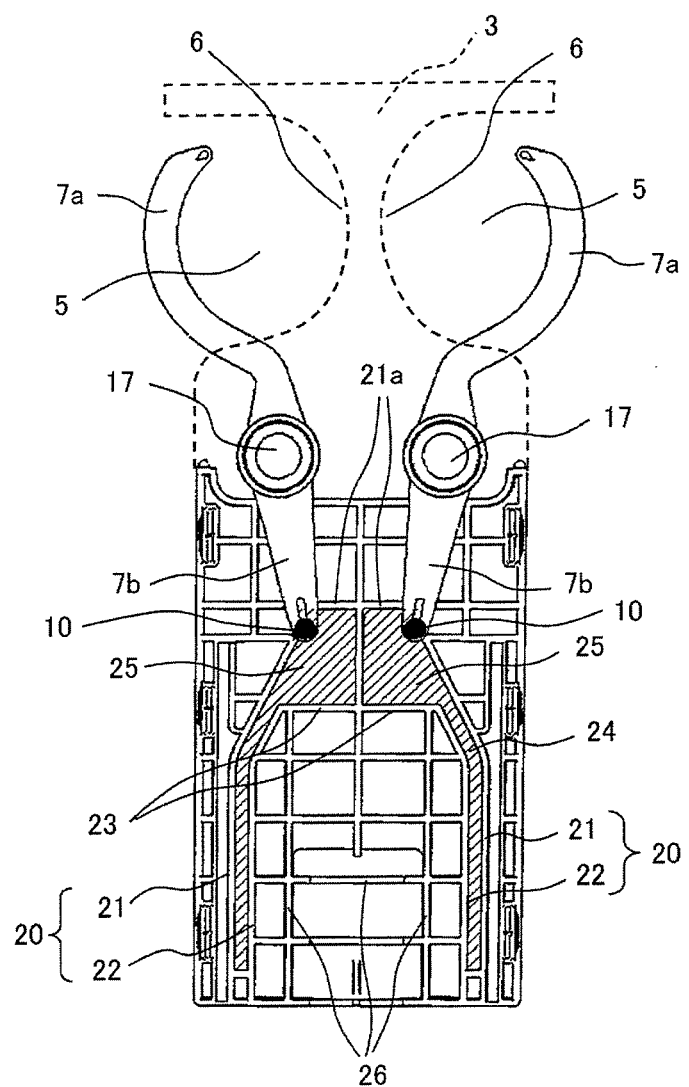
FIG. 7 is a plan view of essential portions showing a state of a holding arm portion for side face holding at a drawing position (according to an embodiment)

In so far as The coil spring 18 adapted to turn and bias the side of the tip end part 7*a* of the holding arm portion 7 to the side of the holding recessed portion 6 is concerned, a center hole of the coil spring 18 is inserted into the turning shaft 17 shown in FIG. 6 and FIG. 7, one end part is engagingly locked to the holding arm portion 7, and the other end part is engagingly locked to the side of the drawing portion 2. The turning shaft 17 is supported by a holder case 14.

Although FIG. 1 illustrates a construction in which the coil spring 18 is employed as a spring adapted to impart a turning force to the holding arm portion 7, a construction employing a torsion spring or a plate spring can also be employed in place of employing the coil spring 18. Alternatively, a construction in which a part of the rear end part of the holding arm portion 7 is extended to thereby utilize an elastic force on such an extended site can be employed as well.

On both side faces of the drawing portion 2, one pair of upper and lower guiderails 11 are respectively constructed, and such one pair of upper and lower guiderails 11 can slide along a guide groove 15 that is formed on an inside face of a holder case 14. In order to restrain a sliding range of the drawing portion 2, a position restraining piece 12a that is bent to the inside is formed at a rear end part of each of the guide rails 11, and a position restraining piece 12b is formed on a site on a front side of each of the guiderails 11 on both side faces of the drawing portion 2.

When the drawing portion 2 is slid to a storage position, the position restraining piece 12a engages with an engagingly locking member, although not shown, which is formed on an inside face of the holder face 14, and a storage state at the storage position of the drawing portion 2 can be maintained. In addition, in so far as the drawing portion 2 that is established in the storage position is concerned, the grip 3a that is formed at the capping body 3 is pulled to a drawing side, whereby the engagingly locking member, although not shown, and the position restraining piece 12a are disengaged from each other, enabling the drawing portion 2 to be slid in the drawing direction.

When the drawing portion 2 is drawn, the position restraining piece 12b engages with an engagement recessed portion 16 that is formed at a front face portion of the holder case 14, and the drawing portion 2 can be maintained in such a state as to be held at the drawing position. A pushing force in a storage direction is applied so as to act on the drawing portion 2 that is held at the drawing position, whereby the position restraining piece 12b and the engagement recessed portion 16 are disengaged from each other, enabling the drawing portion 2 to be slid to the storage position's side.

The guiderail 11 and the position restraining pieces 12a, 12b can also be integrally molded with each other at the time of molding of the drawing portion 2, respectively. Alternatively, these constituent elements can also be constructed so as to be mounted to the drawing portion 2 later in a state in which they are constructed so as to be independent of the drawing portion 2.

Figure 4:
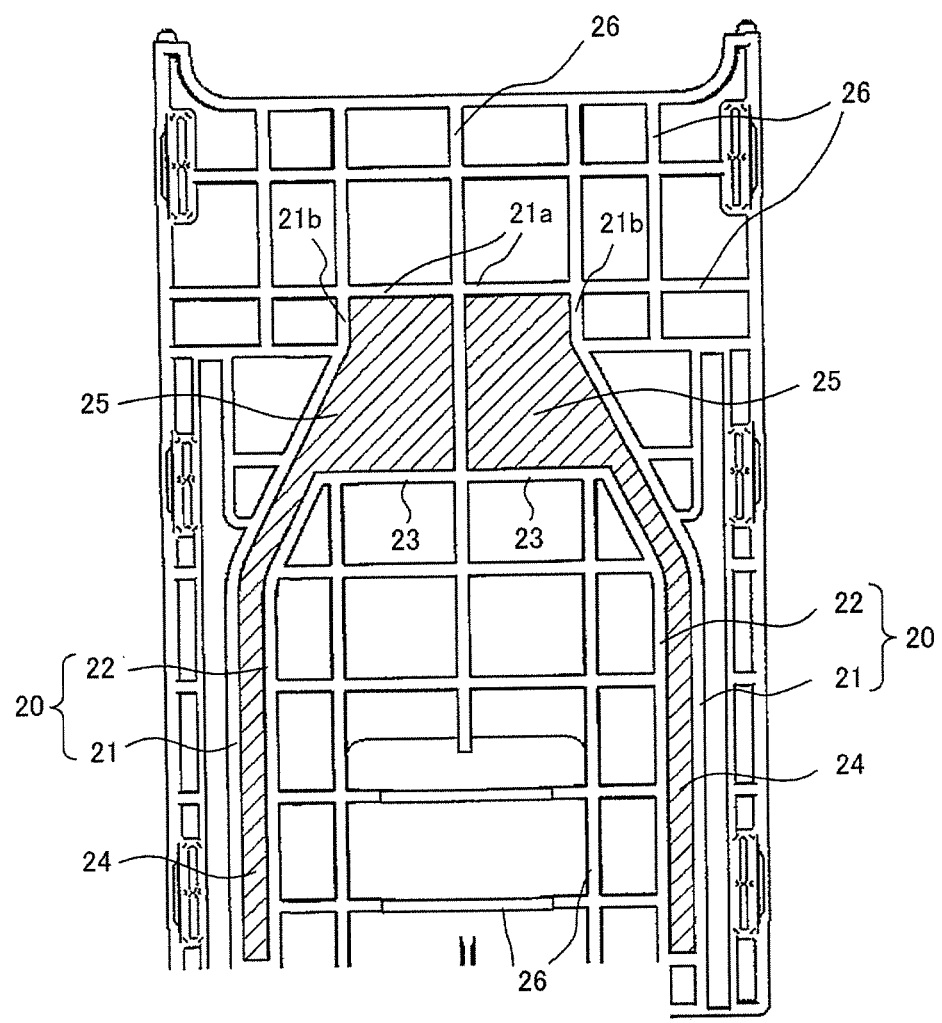
FIG. 4 is a plan view showing a bottom face part of a holder (according to an embodiment)
Figure 5:
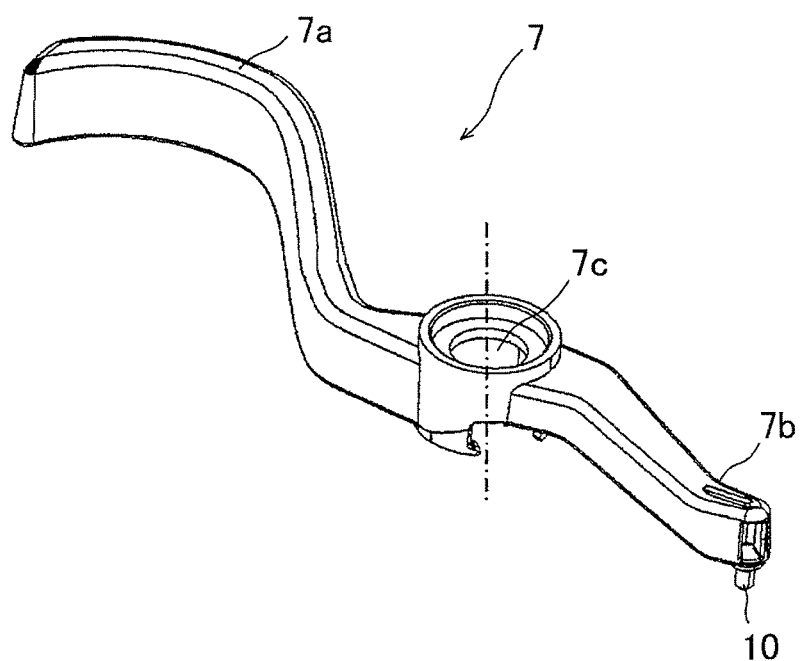
FIG. 5 is a perspective view showing a holding arm portion of a holder case (according to an embodiment)

FIG. 4 shows a planar view of a bottom face part on an interior wall face of the holder case 14, and reinforce ribs 26 enhancing the rigidity of the holder case 14 are formed in a lattice shape. By utilizing a part of the reinforce ribs 26, a guide portion 20 is constructed. The guide portion 20 is constructed with an exterior wall 21 and an interior wall 22, and as shown in FIG. 5, with respect to the protrusion 10 that is formed downward at the rear end part 7b of the holding arm portion 7, a passageway that is formed between the exterior wall 21 and the interior wall 22 is constructed as a movement path 24 for the protrusion 10. A region in which the protrusion 10 can move is indicated by applying a hatching to that region.

The movement path 24 is constructed as a passageway in which a depth side of the holder case 14 is substantially parallel with a sliding direction of the drawing portion 2. In this passageway, as shown in FIG. 6, a position of the protrusion 10 that is formed at the rear end part 7b of the holding arm portion 7 is arranged between the exterior wall 21 and the interior wall 22 that are substantially in parallel with the sliding direction of the drawing portion 2, and the tip end part 7a of the holding arm portion 7 is restrained at a position which is storable in the holder case 14.

Turning to FIG. 4, the movement path 24 that is formed of the exterior wall 21 and the interior wall 22 is constructed so as to be bias to a center side of a transverse direction at a bottom part of the holder case 14 from a partway toward a front side. The movement path 24 biases to the center side, whereby the tip end part 7a of the holding arm portion 7 that is exposed from the opening 14a of the holder case 14 to the outside can be gradually turned to a lateral side against a biasing force of the coil spring 18.

The exterior wall 21 continues its biasing to the center side of the bottom part of the holder case 14 as is, and bends so as to be substantially in parallel with the sliding direction of the drawing portion 2 on a front end side of the guide portion 20, and then, a front end side part 21b is formed. A front end side of the front end side part 21 bends to the center side of the bottom part so as to be substantially perpendicular to the sliding direction of the drawing portion 2, and a front end part 21a of the guide portion 20 is formed.

Also, the interior wall 22 is formed so as to be in parallel with the exterior wall 21 up to partway of the interior wall, and bends to the center side of the bottom part of the holder case 14 so as to be substantially perpendicular to the sliding direction of the drawing portion 2 that is more precedent than the exterior wall 21. In addition, a site of the interior wall 22 that bends to the center part's side so as to be perpendicular thereto is formed as a retraction preventing portion 23 adapted to prevent the retraction of the drawing portion 2 in a state in which a cup is held by the side face support portion 5.

A region that is surrounded by the front end part 21a of the exterior wall 21 and the retraction preventing portion 23 of the interior wall 22 in the guide portion 20 is constructed as a movable range of the protrusion 10 when the drawing portion 2 is set at a drawing position.

Figure 8:
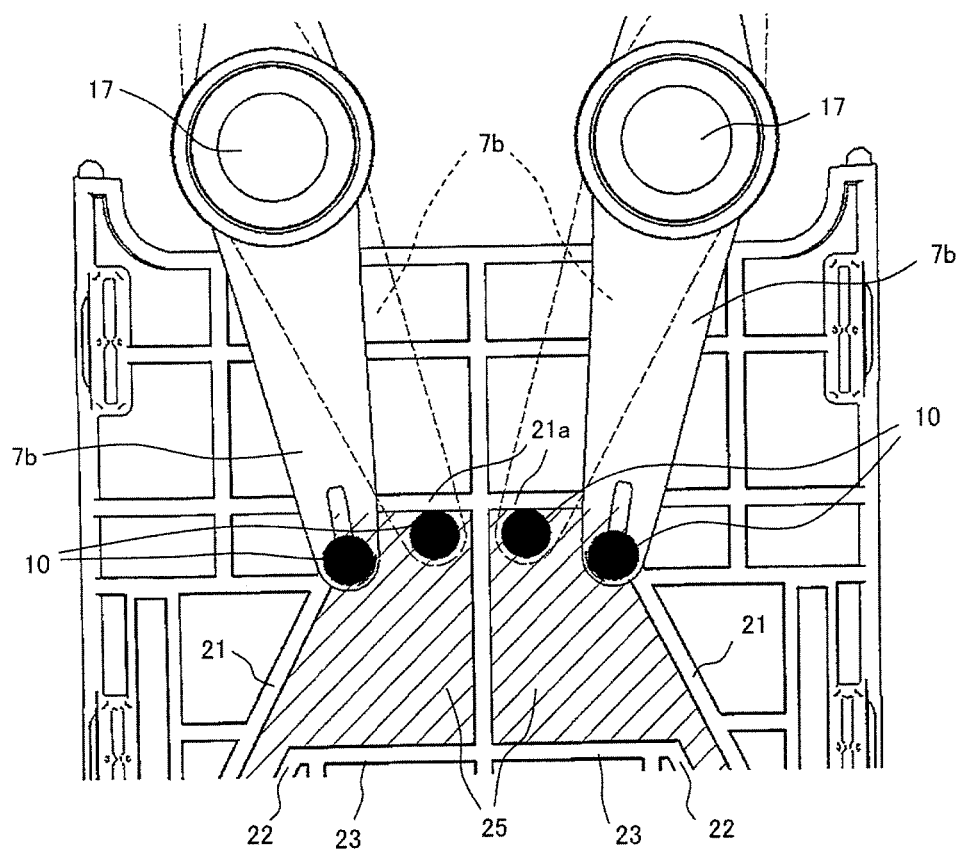
FIG. 8 is an enlarged plan view of essential portions showing a layout relationship between a protrusion and a guide portion at a drawing position (according to an embodiment)

At the drawing position of the drawing portion 2, as indicated by the solid lines of FIG. 7 and FIG. 8, the tip end part 7a of the holding arm portion 7 is established in such a state as to be spaced from the holding recessed portion 6 against the biasing force of the coil spring 18. In addition, a preparation position can be set in such a manner that a cup can be inserted between the holding recessed portion 6 and the tip end part 7a of the holding arm portion 7. At this preparation position, the protrusion 10 abuts against the front end side part 21b (reference should be made to FIG. 4) and then the position of the tip end part 7a of the holding arm portion 7 is restrained.

In addition, at this preparation position, when the cup is pushed between the holding recessed portion 6 and the tip end part 7a of the holding arm portion 7, the tip end part 7a of the holding arm portion 7 turns to the side of a position that is further spaced from the holding recessed portion 6, and the cup can be held between the tip end part 7a of the holding arm portion 7 and the holding recessed portion 6.

That is, the rear end part 7b of the holding arm portion 7 turns from the position indicated by the solid line of FIG. 8 to another position indicated by the dotted line, and the cup can be inserted between the tip end part 7a of the holding arm portion 7 and the holding recessed portion 6. In addition, the cup can be pinched between the tip end part 7a of the holding arm portion 7 and the holding recessed portion 6. At this time, a pinching force of pinching the cup is imparted by the biasing force of the coil spring 18.

Figure 9:
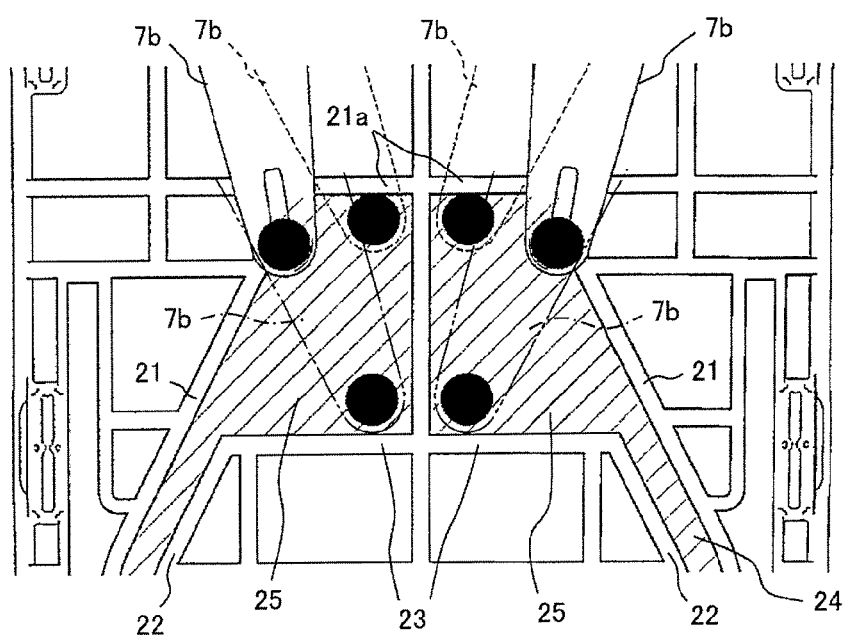
FIG. 9 is an enlarged plan view of essential portions showing a layout relationship between a protrusion and a retraction preventing portion at the time of retraction of a drawing portion (according to an embodiment)

In the case where the drawing portion 2 is set at the drawing position, when no cup is held between the tip end part 7a of the holding arm portion 7 and the holding recessed portion 6, that is, at the position indicated by the solid line in FIG. 9, the rear end part 7b of the holding arm portion 7 is set. At this time, the protrusion 10 can move along the movement path 24 in a state in which the protrusion is guided to the exterior wall 21 by way of the biasing force of the coil spring 18. The drawing portion 2 can then move to the storage position shown in FIG. 6.

However, when the rear end part 7b of the holding arm portion 7 is located at the position indicated by the dotted line in FIG. 9, that is, when the cup is held between the holding recessed portion 6 and the tip end part 7a of the holding arm portion 7, if the drawing portion 2 is pressed against the storage position's side, the rear end part 7b of the holding arm portion 7 is retracted as indicated by the single dotted chain line and then the protrusion 10 that is provided at the rear end part 7b abuts against the retraction preventing portion 23 that is formed on the interior wall 22.

The protrusion 10 abuts against the retraction preventing portion 23, whereby a retracting movement of the drawing portion 2 can be stopped. Although in the foregoing description, there has been explained a construction in which the retraction preventing portion 23 is formed in the holder case 14, the retraction preventing portion 23 is not limited to the construction in which this portion is formed in the holder case 14. For example, in the case of a construction in which the turning shaft 17 of the holding arm portion 7 is arranged on the front side of the holder case 14, the retraction preventing portion 23 can be formed at an opening edge of the holder case 14.

Thus, in accordance with the present invention, it is possible to restrain movement of the drawing portion 2 to the storage position while maintaining the state in which the cup is held between the holding recessed portion 6 and the tip end part 7a of the holding arm portion 7. In addition, it is possible to reliably prevent collapsing of the cup that has been held between the holding recessed portion 6 and the tip end part 7a of the holding arm portion 7 which may eventually result in the overflow of the drink contained therein.

In addition, in so far as a construction of the protrusion 10 that is provided at the rear end part 7b of the holding arm portion 7 is concerned, when the drawing portion 2 is pressed with a further strong force in spite of the protrusion 10 abutting against the retraction preventing portion 23, the protrusion 10 can be constructed so as to be break. In addition, as long as a height dimension of the retraction preventing portion 23 is constructed so as to be a dimension which is lower than a height dimension from a lower face in the rear end part 7b of the holding arm portion 7 leading up to an upper face of the movable range 25, after the protrusion 10 has broken, the rear end part 7b of the holding arm portion 7 is not subject to the movement restraint exerted by the retraction preventing portion 23. In addition, the drawing portion 2 can be moved to the storage position's side, and the breakage of the cup holder 1 can be prevented due to the breakage of the protrusion 10. Further, there can be attained an advantageous effect that it is possible to reduce a reaction force acting on an object in such as manner as to impart a further strong force as described above.

Although in the foregoing description, there has been explained a construction in which the retraction of the drawing portion 2 is restrained by causing the protrusion 10 to abut against the retraction preventing portion 23, there can also be employed a construction in which the rear end part 7b of the holding arm portion 7 is caused to directly abut against the retraction preventing portion 23. In addition, although a description has been given with respect to a construction in which the protrusion 10 is protruded to the bottom face side of the holder case 14, in the case where the retraction preventing portion 23 is formed on a ceiling interior face of the holder case 14, the protrusion 10 can be formed so as to be oriented in an upward direction. Further, in the case where the retraction preventing portion 23 is formed on an inside face of the holder case 14, the protrusion 10 can be constructed so as to be protruded on the inside face's side of the holder case 14.

Figure 10:
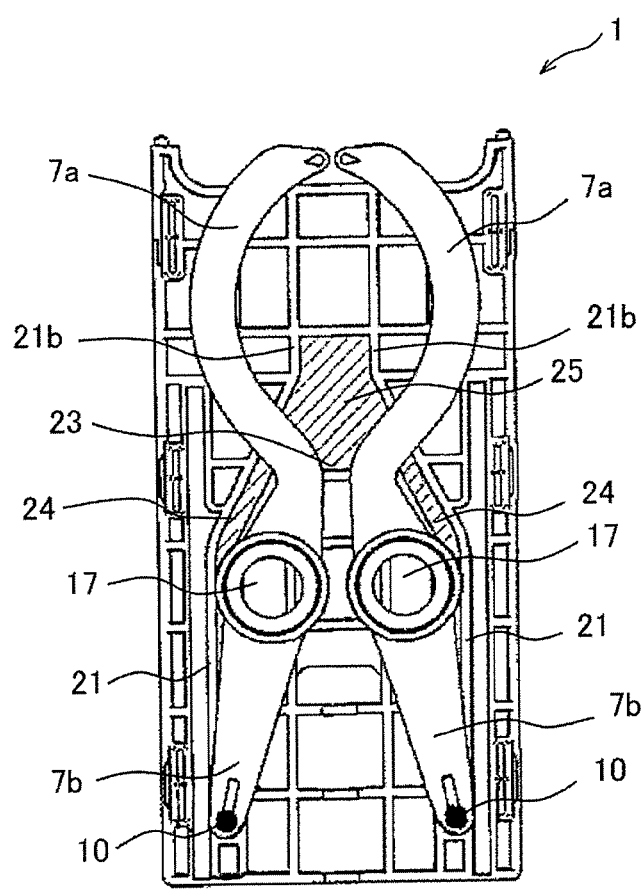
FIG. 10 is a plan view of essential portions in which a side face support portion is made of one pair of holding arm portions for side face holding (according to an embodiment)

In the foregoing description, there has been explained an example of a construction in which the side face support portion 5 is constructed with a combination of the holding recessed portion 6 and the holding arm portion 7. In so far as a construction in the side face support portion 5 is concerned, as shown in FIG. 10, it is also possible to make a construction employing one pair of holding arm portions 7, 7. The side face support portion 5 is constructed by employing such one pair of holding arm portions 7, 7, whereby a cup can be held by means of a pinching force exerted by such one pair of holding arm portions 7, 7.

In addition, in the case of such a construction as well, in the case where the drawing portion 2 is pushed in a state in which the cup is held between such one pair of holding arm portions 7, 7, the rear end parts 7b, 7b of the holding arm portions 7, 7 each abut against the retraction preventing portion 23. Further, it is possible to prevent the retraction of the drawing portion 2 in the state in which the cup is held between the pair of holding arm portions mentioned above. Moreover, protrusions 10, 10 that are formed at the respective rear end portions 7b, 7b in such one pair of holding arm portions 7, 7 respectively abut against the retraction preventing portion 23, thus enabling the abutment between the retraction preventing portion 23 and each of the protrusions 10, 10 to be obtained as a more reliable abutment.

Next, a construction of the holding arm portions 27, 30 for bottom receiving will be described with reference to FIG. 11 and FIG. 12. In so far as a construction of the bottom face support portion 4 is concerned, although a description has been given with respect to a construction in which this bottom face support portion is constructed as a bottom face plate that is fixed to the drawing portion 2, as shown in FIG. 11, it is possible to make a construction employing the holding arm portion 27 for bottom receiving, and as shown in FIG. 12, it is also possible to make a construction employing a holding arm portion 30 for bottom receiving.

As shown in FIG. 11, the holding arm portion 27 is constructed so as to be turn in a vertical direction around the turning shaft 28 that is pivoted on a tip end side of the drawing portion 2. Although in the illustrative example, the holding arm portion 27 is formed in a substantial L-shape in a lateral side view, this holding arm portion can also be formed in a substantial U-shape, as shown in FIG. 12.

In FIG. 11, in so far as a construction of the holding arm portion 27 is concerned, a non-holding state of the cup 29 is indicated by the dotted line, and a holding state of the same cup is indicated by the solid line. In addition, FIG. 12 (a) shows a state in which a bottom face of the cup 29 that is indicated by the phantom line is held by the holding arm portion 30. As shown in FIG. 12 (b), the holding arm portion 30 can be turned in a vertical direction by way of the turning shaft 30 that is pivoted on a tip end side of the drawing portion, although not shown. Further, the bottom face of the cup 29 can also be held by a tip end part 30a of the holding arm portion 30.

As shown in FIG. 12, a protrusion 32 is formed at a rear end part of the holding arm portion 30. In a state in which the bottom face of the cup 29 is held by the holding arm portion 30, when the drawing portion 2 (reference should be made to FIG. 1) is pushed to a storage position, the protrusion 32 of the holding arm portion 30 that is indicated by the solid line of FIG. 12 (b) abuts against the retraction preventing portion 33 that is formed in the holder case 14 (reference should be made to FIG. 1), thus making it possible to prevent a retracting movement of the drawing portion 2 in the state in which the cup 29 is held.

In a state in which the cup 29 is not held by the holding arm portion 30, when the drawing portion 2 is pushed to the storage position, the protrusion 32 of the holding arm portion 30 that is indicated by the dotted line of FIG. 12 (b) does not abut against the retraction preventing portion 33, and the drawing portion 2 can be housed at the storage position. When the bottom part of the cup 29 is held by the holding arm portion 27 shown in FIG. 11, the holding arm portion 27 abuts against the retraction preventing portion, although not shown, which is formed on an opening edge of the holder case 14, and then, the retraction of the drawing portion 2 can be prevented.

Although in FIG. 11 and FIG. 12, a construction of a spring adapted to bias the holding arm portions 27, 30 in a substantially horizontal direction is not shown, in so far as such a spring adapted to bias the holding arm portions 27, 30 in the substantially horizontal direction is concerned, for example, a torsion spring can be constructed so as to be arranged at a shaft portion of each of the turning shafts 28, 31. Alternatively, it is also possible to make a construction employing a coil spring or a construction employing a plate spring or the like.

By way of the bottom face plate that is fixed to the drawing portion 2, or alternatively, by employing the holding arm portions 27, 30 for bottom receiving in place of constructing the bottom face support portion 4 shown in FIG. 1, a height dimension of the cup holder 1 can be constructed so as to be low in levelness.

INDUSTRIAL APPLICABILITY

A technical idea of the present invention can also be applied in a construction of a drawing device.

DESCRIPTION OF REFERENCE NUMERALS

1 . . . Cup holder
2 . . . Drawing portion
5 . . . Side face support portion
6 . . . Holding recessed portion
7 . . . Holding arm portion
10 . . . Protrusion
14 . . . Holder case
20 . . . Guide portion
21 . . . Exterior wall
22 . . . Interior wall
23 . . . Retraction preventing portion
27 . . . Holding arm portion
30 . . . Holding arm portion
32 . . . Protrusion
33 . . . Retraction preventing portion

What is claimed is:

1. A cup holder comprising:
a holder case of which a front face opens; and
a drawing portion that is assembled in the holder case, and that is capable of retractably sliding into the holder case through an opening of the holder case, wherein
the drawing portion has a support portion adapted to a cup,
the support portion includes a holding arm that is pivoted on the drawing portion via a turning shaft, and that turns in a direction crossing a drawing direction of the drawing portion,
the holding arm portion has a tip end part adapted to abut against and hold a cup and a rear end part that is arranged on an opposite side to the tip end part in a state in which the turning shaft is sandwiched therebetween, and
a retraction preventing portion adapted to prevent retraction of the drawing portion in a state in which the cup is held by the support portion by way of abutment against the rear end part's side of the holding arm portion is formed in the holder case
wherein a protrusion is formed at the rear end part of the holding arm portion, and when the drawing portion is retracted in a state in which a cup is held by the support portion, the protrusion abuts against the retraction preventing portion,
wherein on the holding arm portion, a spring adapted to turn and bias one end side of the holding arm portion toward a cup holding direction is provided,
in the holder case, a guide portion adapted to guide a rear end part of the holding arm portion is formed,
the guide portion restrains a tip end part's side of the holding arm at a position which is storable in the holder case, and when the drawing portion is drawn and a state in which the cup can be held by the support portion is established, the guide portion is formed in a shape that allows a tip end part's side of the holding arm to turn in a further widening direction from a holding position side of the cup against a spring force of the spring, and
the retraction preventing portion is constructed as a part of the guide portion.

2. The cup holder according to claim 1, wherein
when the protrusion breaks, a rear end part's side of the holding arm portion and the retraction preventing portion are arranged in such a state as to be free of abutment against each other.

3. The cup holder according to claim 1, wherein
the support portion has a holding recessed portion that is formed in the retracting portion and the holding arm portion that turns in a horizontal direction, and
a side face of the cup is held between the tip end part's side of the holding arm portion that turns in the horizontal direction and the holding recessed portion.

4. The cup holder according to claim 1, wherein the retraction preventing portion is formed on an inside face of the holder case and the protrusion is oriented in a direction toward the inside face's side of the holder case.

5. The cup holder according to claim 1, wherein the retraction preventing portion is formed on a ceiling interior face of the holder case and the protrusion is oriented in an upward direction.

* * * * *